(12) United States Patent
Mrazek et al.

(10) Patent No.: US 7,755,631 B1
(45) Date of Patent: Jul. 13, 2010

(54) TRANSPOSITION STRUCTURES AND METHODS TO ACCOMMODATE PARALLEL PROCESSING IN A GRAPHICS PROCESSING UNIT ("GPU")

(75) Inventors: Dane T. Mrazek, Redwood City, CA (US); Sameer M. Gauria, Mountain View, CA (US); James C. Bowman, Pescadero, CA (US)

(73) Assignee: Nvidia Corporation, Santa Clara, CA (US)

( * ) Notice: Subject to any disclaimer, the term of this patent is extended or adjusted under 35 U.S.C. 154(b) by 788 days.

(21) Appl. No.: 11/552,350

(22) Filed: Oct. 24, 2006

(51) Int. Cl.
*G06F 15/00* (2006.01)
(52) U.S. Cl. .................................................. 345/501
(58) Field of Classification Search ................ 345/501, 345/505–506
See application file for complete search history.

(56) References Cited

U.S. PATENT DOCUMENTS

| | | | | |
|---|---|---|---|---|
| 5,557,734 | A * | 9/1996 | Wilson ......................... | 345/505 |
| 5,812,147 | A * | 9/1998 | Van Hook et al. ............ | 345/537 |
| 6,288,723 | B1 * | 9/2001 | Huff et al. .................... | 345/644 |
| 6,947,047 | B1 * | 9/2005 | Moy et al. .................... | 345/501 |
| 6,972,769 | B1 * | 12/2005 | Nebeker et al. .............. | 345/552 |
| 7,119,808 | B2 * | 10/2006 | Gonzalez et al. ............ | 345/502 |
| 7,362,339 | B2 * | 4/2008 | Honme ......................... | 345/629 |
| 7,570,267 | B2 * | 8/2009 | Patel et al. ................... | 345/522 |

OTHER PUBLICATIONS

Limousin et al., Improving 3D Geometry Transformations on a Simultaneous Multithreaded SIMD Processor, 2001, ACM Press, ICS '01, pp. 236-245.*
Shen et al, Modern Processor Design: Fundamentals of Superscalar Processors, Jul. 2002, McGraw-Hill, Beta Edition, pp. 422-444.*

* cited by examiner

*Primary Examiner*—Xiao M Wu
*Assistant Examiner*—Charles Tseng
(74) *Attorney, Agent, or Firm*—Cooley LLP

(57) ABSTRACT

Disclosed are an apparatus, a method, a programmable graphics processing unit ("GPU"), a computer device, and a computer medium to facilitate, among other things, the generation of parallel data streams to effect parallel processing in at least a portion of a graphics pipeline of a GPU. In one embodiment, an input of the apparatus receives graphics elements in a data stream of graphics elements. The graphics pipeline can use the graphics elements to form computer-generated images. The apparatus also can include a transposer configured to produce parallel attribute streams. Each of the parallel attribute streams includes a type of attribute common to the graphics elements. In one embodiment, the transposer can be configured to convert at least a portion of the graphics pipeline from a single data stream to multiple data streams (e.g., executable by multiple threads of execution) while reducing the memory size requirements to implement such a conversion.

13 Claims, 7 Drawing Sheets

TRANSPOSITION STRUCTURES AND METHODS TO ACCOMMODATE PARALLEL PROCESSING IN A GRAPHICS PROCESSING UNIT ("GPU")

BRIEF DESCRIPTION OF THE INVENTION

This invention relates generally to computing devices and graphics processing units, and more particularly, to an apparatus and method that facilitates parallel processing in at least a portion of a programmable graphics pipeline, such as in a vertex processor.

BACKGROUND OF THE INVENTION

Single instruction, single data ("SISD") processing techniques and processors are common in graphics pipelines of most traditional graphics processing units ("GPUs"). SISD processing elements operate on single units of data at a time. Examples of such SISD processing elements include vertex and pixel processors (or shaders). SISD-compatible interfaces connect the various SISD processing elements to each other. For example, one type of SISD-compatible interface couples a traditional SISD-based vertex processor to a single data stream of vertex attributes. Once the SISD vertex processor receives the vertex attributes, it operates on the attributes in one thread of execution. While functional, conventional interfaces for SISD processing elements in graphics pipelines are not well suited for supporting processing elements that implement single instruction, multiple data ("SIMD") processing techniques. Thus, graphics pipelines that provide vertex information in a single data stream cannot readily be adapted to support multi-threaded processing.

In view of the foregoing, it would be desirable to provide an apparatus, a method, a programmable GPU, a computer device, and a computer medium that minimize the above-mentioned drawbacks, thereby facilitating, among other functions, parallel processing in at least a portion of a programmable graphics pipeline, such as in a vertex processor.

SUMMARY OF THE INVENTION

Disclosed are an apparatus, a method, a programmable graphics processing unit ("GPU"), a computer device, and a computer medium to facilitate the generation of parallel data streams, among other things, to effect parallel processing in at least a portion of a graphics pipeline of a GPU. In one embodiment, an input of the apparatus can be configured to receive graphics elements in a graphics element data stream. One example of a graphics element is a vertex that includes vertex information, such as vertex attributes. Also, the apparatus can include a transposer for producing parallel attribute streams. Each of the parallel attribute streams includes a type of attribute that is common to one or more graphics elements. In some instances, the transposer can generate the parallel attribute streams for parallel processors of the GPU. Further, the transposer can be configured to convert at least a portion of the graphics pipeline from a single data stream to multiple data streams (e.g., executable by multiple threads of execution), while reducing the memory size requirements to implement such a conversion.

In a specific embodiment, the transposer includes a memory for storing portions of the graphics elements in a data arrangement having rows and columns, the transposer being configured to perform transposition functions that modify the ordering of data exiting the transposer from the order in which the data enters the transposer. The ordering (or re-ordering) of data exiting and entering the transposer thereby emulates the transposition of the data arrangement. Advantageously, emulating the transposition of the data increases the utilization rate of the memory and thus reduces the time during which the memory (or portions thereof) remain idle. Further, the emulation facilitates extraction of a number of the same type of attribute for execution by parallel processes without the need to physically transpose the data arrangement.

In another embodiment, the transposer further includes a memory including an overlapped memory region and one or more spill-over regions. The overlapped memory region is subject to substantially concurrent performance of first and second transposition functions, whereas the spill-over regions are subject to one of the first or second transposition functions at a time. Advantageously, the memory capacity of the combination of the overlapped memory region and the spill-over regions is less than two separate buffers implementing double buffering. In yet another embodiment, the apparatus can include an attribute arrangement manager and an attribute selector. The attribute arrangement manager influences the graphics elements to enter the transposer in a first orientation. The attribute selector identifies subsets of attributes that each includes the same type of attribute. Then, the attribute selector selects the subset of attributes for extraction from the transposer in a second orientation. The attribute arrangement manager and the attribute selector switch are configured to switch orientations during different phases. For example, the first orientation can be in the same direction as one or more rows and the second orientation can be in the same direction as one or more columns. In some cases, the attribute arrangement manager arranges data for the graphics elements into a matrix and the attribute selector accesses the data as a transposed matrix. The graphics elements can include vertices each of which include any number of attributes. Examples of such attributes include a coordinate describing position (e.g., x, y or z coordinate), a color component (e.g., red, green, blue, and/or alpha), texture information, one or more normal vectors, and the like.

In various embodiments, computer readable media (or a computer readable medium) include executable instructions to accommodate a vertex processor implementing parallel processors. The computer readable media include one or more executable instructions to fetch vertex information including vertex attributes. The computer readable media also can include instructions to emulate transposition of the attributes to associate common types of the attributes with individual parallel processes of the vertex processor. These executable instructions can cooperate to convert at least a portion of a graphics pipeline from a single data stream (e.g., executable by a single thread of execution) into multiple data streams (e.g., executable by multiple threads of execution). In one instance, the executable instructions to emulate transposition includes one or more executable instructions to store the vertex attributes into a memory having a data arrangement describable in terms of rows and columns, as well as to generate parallel data streams each of which relate to a common vertex attribute from the vertex attributes. In some cases, the data arrangement is a matrix. In alternate embodiments, a processor operates in response to the executable instructions to produce computer-generated images. The processor includes a frame buffer memory configured to provide vertex attributes for vertices, a multithreaded vertex processor configured to process the vertex attributes, and a transposer configured to receive the vertex attributes and to provide subsets of the vertex attributes to the multithreaded vertex processor as separate parallel data streams. In at least one embodiment, the transposer includes a memory having a data arrangement describable as a matrix in terms of rows and columns, as well as a means for controlling access to the memory to emulate transposition of the matrix.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION OF EXEMPLARY EMBODIMENTS

Figure 1:
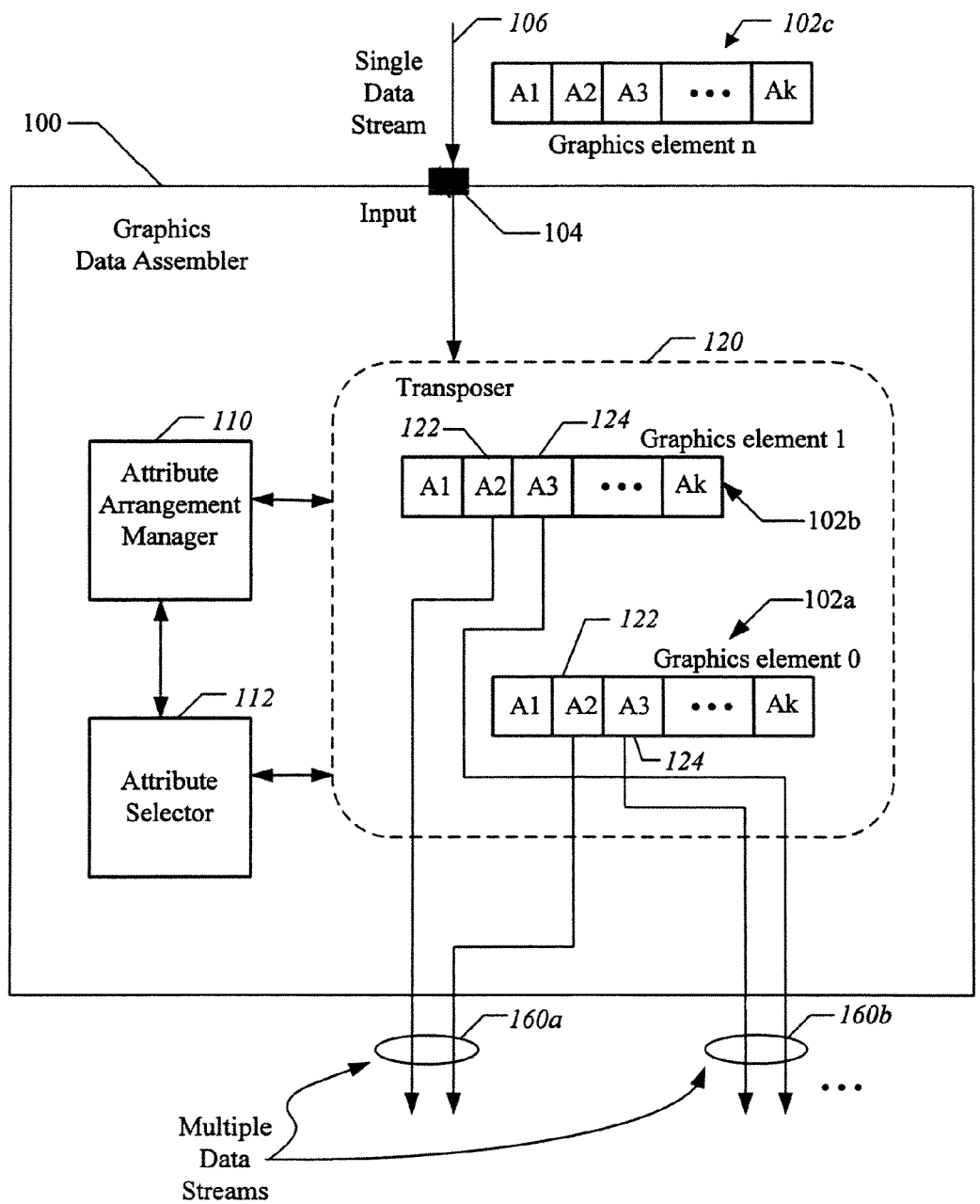
FIG. 1 is a block diagram of an apparatus for generating parallel data streams to effect parallel processing in at least a portion of a graphics pipeline of a GPU, according to at least one specific embodiment of the invention.

FIG. 1 is a block diagram of an apparatus for generating parallel data streams to effect parallel processing in at least a portion of a graphics pipeline of a GPU, according to at least one specific embodiment of the invention. In the example shown, a graphics data assembler 100 is configured to receive a single data stream 106 of data representing graphics elements 102. Graphics elements 102 include information, such as vertex information, that supports the rendering of computer-generated images. In addition, graphics data assembler 100 is configured to assemble the data into a form useable by parallel processes downstream from the point at which it resides in a graphics pipeline (not shown). Graphics data assembler 100 includes an input 104 for receiving graphics elements 102 from data stream 106. Graphics data assembler 100 also includes a transposer 120 configured to produce parallel attribute streams 160 from the data representing graphics elements 102 or portions thereof. Each of parallel attribute streams 160 includes a type of attribute common to graphics elements 102. In some instances, transposer 120 can generate parallel attribute streams 160 in formats useable by parallel processors of the GPU (not shown). Advantageously, transposer 120 can be configured to reduce memory size requirements to implement a conversion of at least a portion of the graphics pipeline from a single data stream 106 to multiple data streams 160, which accommodate multiple threads of execution.

To illustrate the operation of transposer 120, consider that a number of attributes (e.g., attributes A1, A2, A3, . . . Ak) constitute each of graphics element ("0") 102a and graphics element ("1") 102b. Transposer 120 receives graphics element ("0") 102a and graphics element ("1") 102b via input 104 from data stream 106, and then generates multiple parallel data streams 160. For example, transposer selects attributes ("A2") 122 and attributes ("A3") 124 from multiple graphics elements 102 to generate parallel data stream 160a and parallel data stream 160b, respectively. In some embodiments, transposer 120 generates multiple parallel data streams 160 for parallel processing, for example, by a vertex processor or shader (not shown). Advantageously, graphics data assembler 100 can provide multiple parallel data streams 160 of vertex attributes to an SIMD-based vertex processor, which uses "single instruction, multiple data" processing techniques.

In a specific embodiment, transposer 120 includes a memory (not shown) for storing portions of graphics elements 102, in a data arrangement having rows and columns. In various embodiments, transposer 120 emulates the transposition of the data arrangement without expending computational overhead to effect an actual transposition. In particular, transposer 120 performs transposition functions to modify the order in which data enters and exits transposer 120. It is the ordering (and re-ordering) of the data exiting and entering that gives rise to the emulated transposition of the data arrangement. For example, data for graphics elements 102 can enter transposer in a first orientation as a collection of attributes associated with a single graphics element 102. But each common attribute can exit as data for groups of common attributes. Advantageously, graphics data assembler 100 coordinates the orientations in which the data enters and exits transposer 120 to reduce the number of memory elements (e.g., memory cells or locations) for implementing the transposition functions. In some embodiments, the term transposition function refers to the reading of common attributes in an orientation that differs from the orientation used for writing the common attributes into the transposer.

Graphics data assembler 100 can include an attribute arrangement manager 110 and an attribute selector 112, according to various embodiments of the invention. Attribute arrangement manager 110 operates to influence the orientations of graphics elements 120 entering the transposer during different phases. For example, during a first phase, attribute arrangement manager 110 arranges the attribute data for graphics elements 120 in a first orientation (e.g., vertically), whereas in a second phase, it arranges the attribute data in a second orientation (e.g., horizontally). Attribute selector 112 identifies subsets of attributes that each include the same type of attribute, such as the subset including attributes ("A2") 122 from graphics elements 102. In addition, attribute selector 112 selects the subset of attributes for extraction from transposer 120, such as a group of the same type of attribute (e.g., attributes ("A2") 122). Attribute selector 112 extracts the groups of common attributes in an orientation different from that used by attribute arrangement manager 110 to previously store the attributes into transposer 120. During the performance of multiple transposition functions, attribute arrangement manager 110 and attribute selector 112 both switch the orientations with which data enters and exits, respectively, transposer 120.

Figure 2:
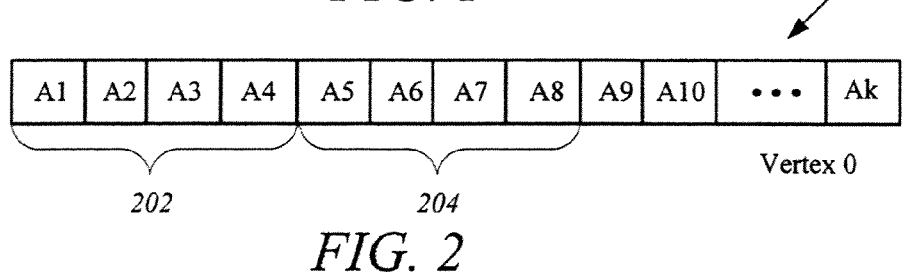
FIG. 2 is a diagram showing the graphics elements of FIG. 1 as vertex information including vertex attributes for each vertex, according to a specific embodiment of the invention.

FIG. 2 is a diagram showing the graphics elements of FIG. 1 as vertex information including vertex attributes for each vertex, according to a specific embodiment of the invention. In this example, the data representing a graphics element constitutes a "vertex" 200, which can represent a corner of a primitive, such as a triangle, that is used to create three-dimensional ("3D") objects. Each vertex 200 is associated with information for generating 3D images. Attributes 202 can include 3D coordinates. For instance, attributes A1 to A4 can represent an X coordinate, a Y coordinate, a Z coordinate, and an optional W value (e.g., describing weight), respectively. Also, attributes 204 can include color component data. For instance, attributes A5 to A8 in an RGB color space can respectively represent a Red color component, a Green color component, a Blue color component, and an Alpha filtering value. In other embodiments, vertex 200 can be associated with other attributes, such as texture coordinates (e.g., in terms of s, t, r and q), one or more normal vectors, and the like.

Figure 3:
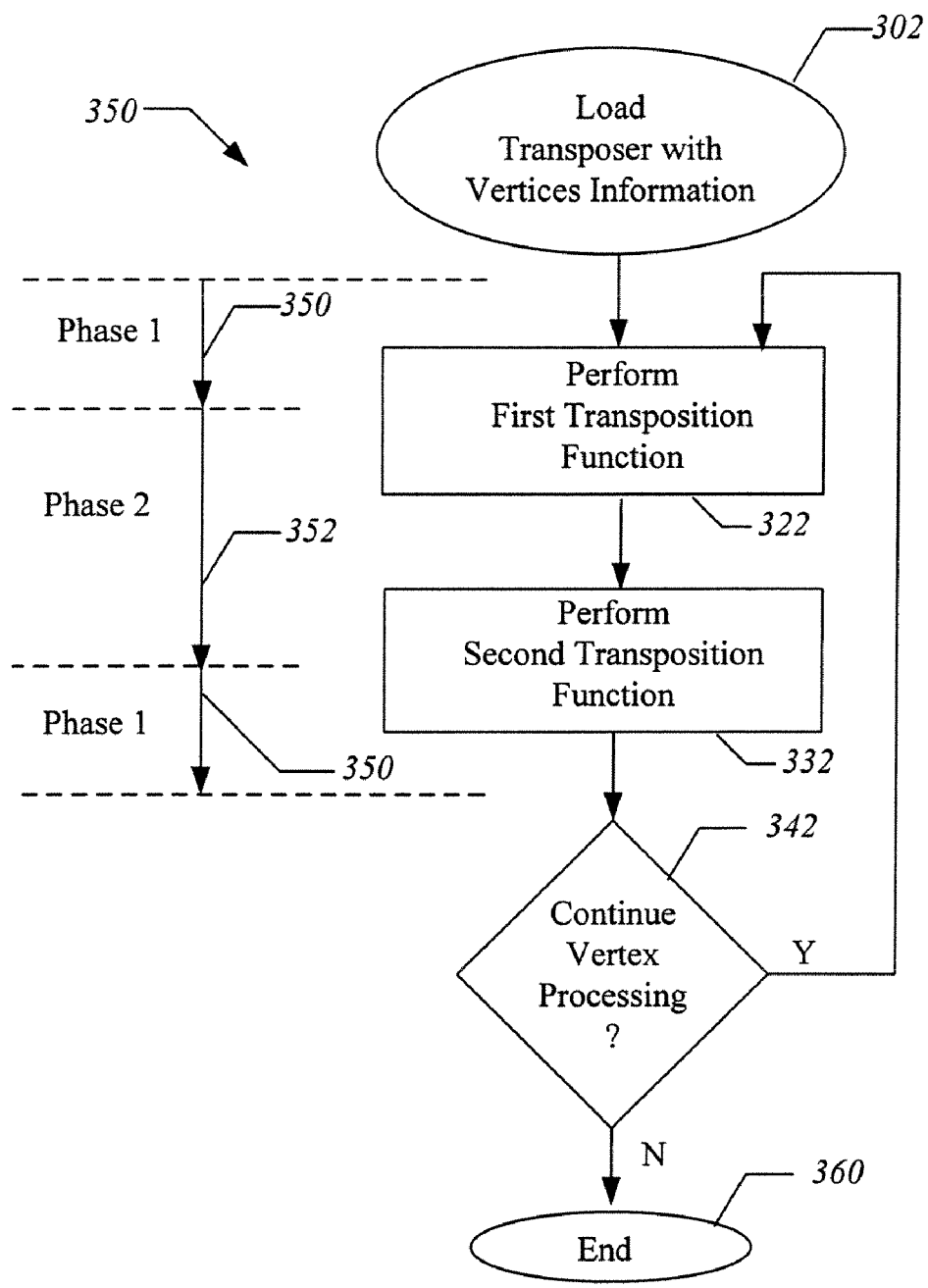
FIG. 3 depicts one example of a flow using a transposer to effect parallel processing in at least a portion of a graphics pipeline of a GPU, according to at least one specific embodiment of the invention.

FIG. 3 depicts one example of a flow using a transposer to effect parallel processing in at least a portion of a graphics pipeline of a GPU, according to at least one specific embodiment of the invention. Flow 300 initializes a transposer 302 by loading it with vertex information. For example, the transposer can store vertex attributes into a memory having a data arrangement describable in terms of the orientations with which data is written into and read from memory. In one embodiment, the memory can be describable in terms of rows and columns. The transposer performs a first transposition function at 322 and second transposition function at 332. During the first transposition function, the transposer reads common types of the attributes from a data arrangement in a first orientation (e.g., columns) and then writes vertex attributes for vertices into the data arrangement in a second orientation (e.g., rows). In at least one embodiment, the transposer reads the common types of the attributes in the first orientation during a first phase ("phase 1") 350 and then writes the vertex attributes in the second orientation during a second phase ("phase 2") 352. During the second transposition function at 332, however, the transposer writes vertex attributes for vertices into the data arrangement in the first orientation and reads common types of attributes from the data arrangement in the second orientation. Note that the transposer can both read common types of attributes and write vertex attributes during the same phase. The portion of memory that is subject to both reads and writes can be referred to as the "overlapped" memory region, as is discussed in FIG. 4. The above-described transposer functions continue to generate parallel data streams of common vertex attributes so long as vertex processing continues. If vertex processing ceases at 342, then transposer halts its processing at 360.

Figure 4:
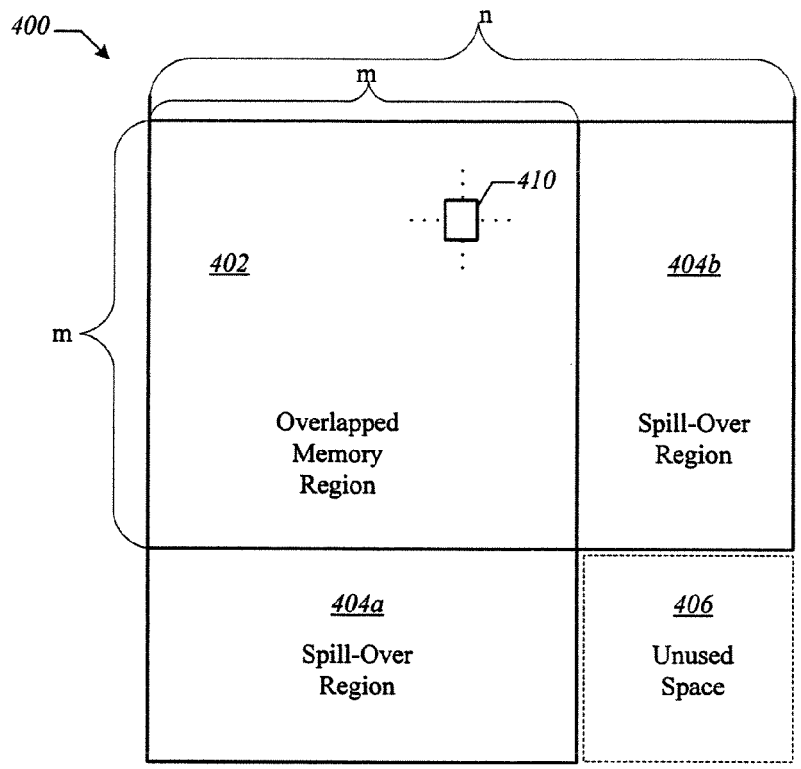
FIG. 4 is a diagram of a memory space for implementing a transposer to generate parallel data streams, according to at least one specific embodiment of the invention.

FIG. 4 is a diagram of a memory space for implementing a memory for a transposer used to generate parallel data streams to effect parallel processing, according to at least one specific embodiment of the invention. Memory space 400 includes an overlapped memory region 402 and spill-over regions 404a and 404b, but excludes space 406. Overlapped memory region 402 is subject to different storage access operations (e.g., write and read operations) for both the first and second transposition functions. Spill-over regions 404a and 404b are subject to one storage access operation during each of two transposition functions. Both overlapped memory region 402 and spill-over regions 404a and 404b are composed of a number of memory locations 410 at which a value, such as an attribute, can be stored.

Figure 9:
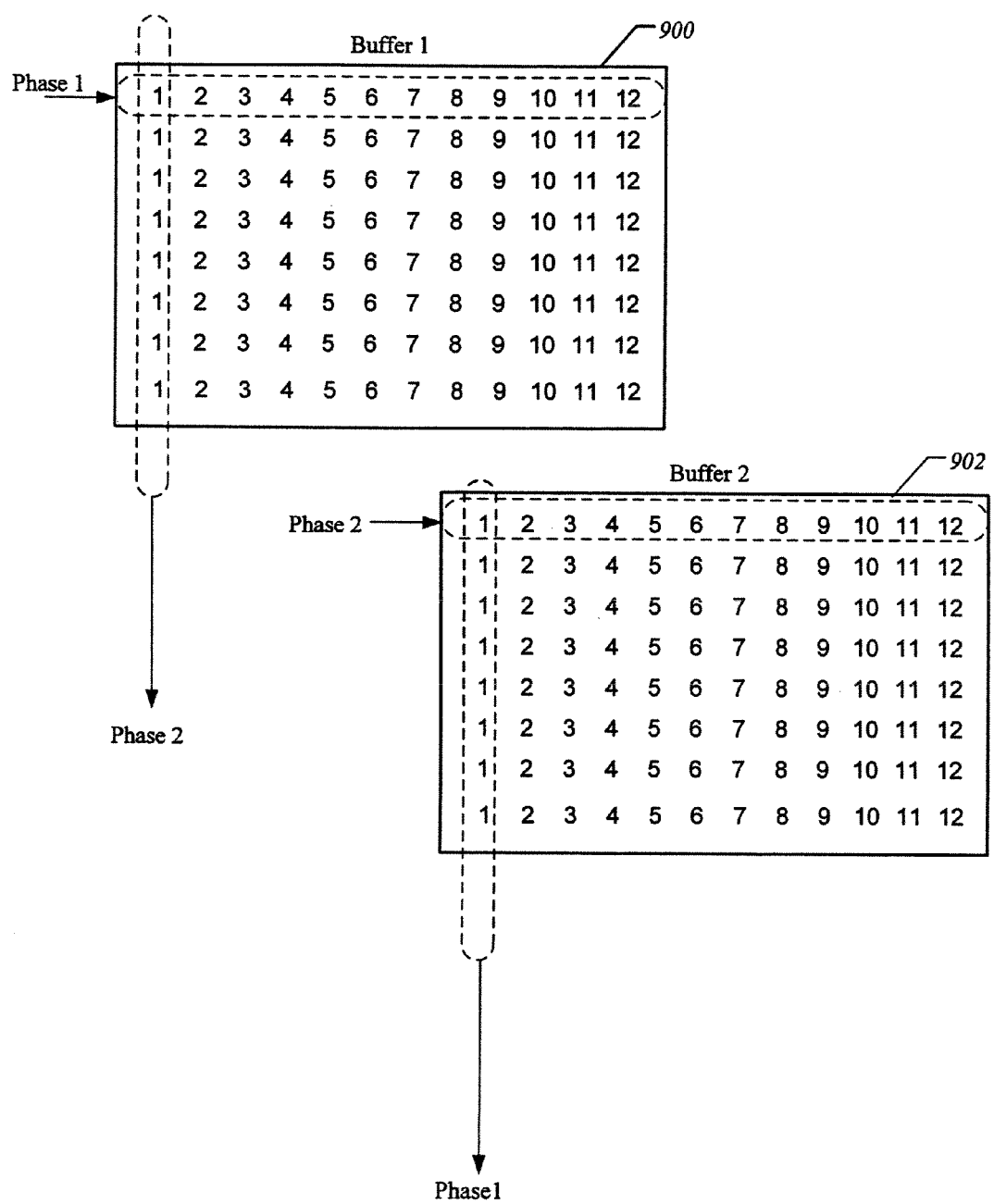
FIG. 9 illustrates an example of a transposer using a memory space that implements double buffering in accordance with an embodiment of the invention.

Memory space 400 uses overlapped memory region 402 for concurrent or nearly concurrent write and read operations. Such concurrent operations can include concurrent vertical writing operations into columns and horizontal reading operations from rows. Or, the concurrent operations can include concurrent horizontal writing operations and vertical reading operations. By using concurrent write and read operations, the utilization rate of this region is increased, which reduces the memory capacity required to implement a transposer. Memory space 400 uses spill-over regions 404a and 404b to provide storage space for an amount of memory required to store the difference between the number of columns and the number of rows. For example, consider that memory space 400 is configured to accommodate a data arrangement of "m" row by "n" columns, where the value of "m" is less than "n." As such, each of spill-over regions 404a and 404b provide a number of memory locations 410 equivalent to the product of the values "m" and "n-m." Advantageously, memory space 400 can be implemented in a memory that requires less memory capacity than, for example, two separate buffers implementing double buffering as shown in FIG. 9.

Figure 5:
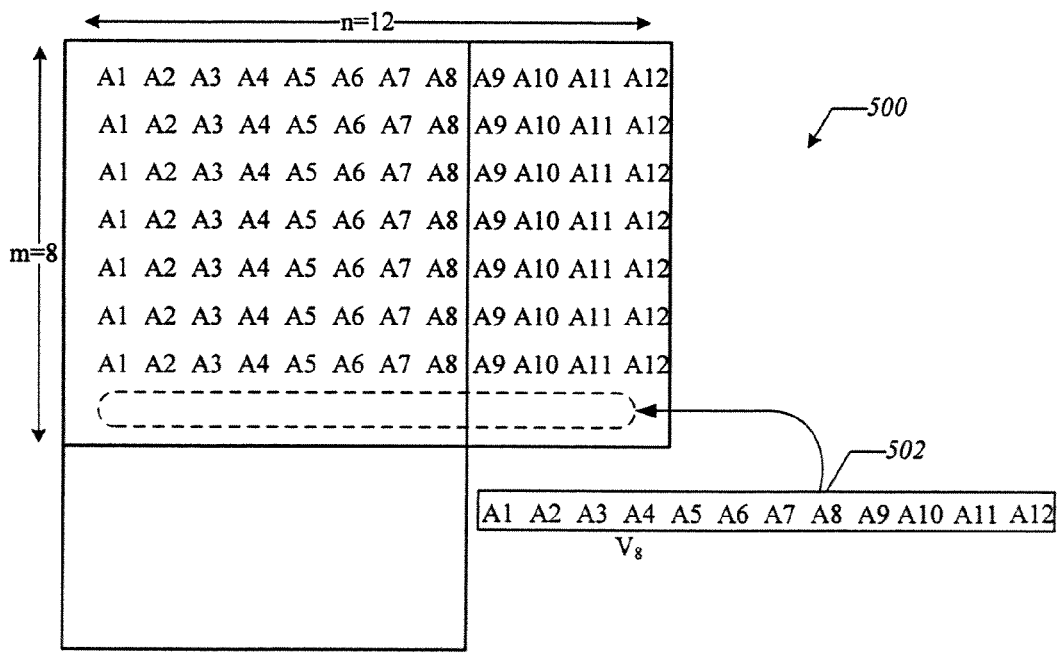
FIGS. 5 to 7 illustrate the memory space of FIG. 4 during the operational phases of a transposer, according to various embodiments of the invention.

FIG. 5 illustrates a memory space being initialized to include vertex attributes, according to one embodiment of the invention. In this example, memory space 500 is initialized to include a data arrangement of eight rows of vertices (e.g., one vertex per row). Each vertex includes twelve attributes, A1 to A12, where each of the attributes is a scalar value including, for example, 32 bits of information. The eighth vertex ("V8") 502 is shown to be loaded last into the eighth row.

Figure 6:
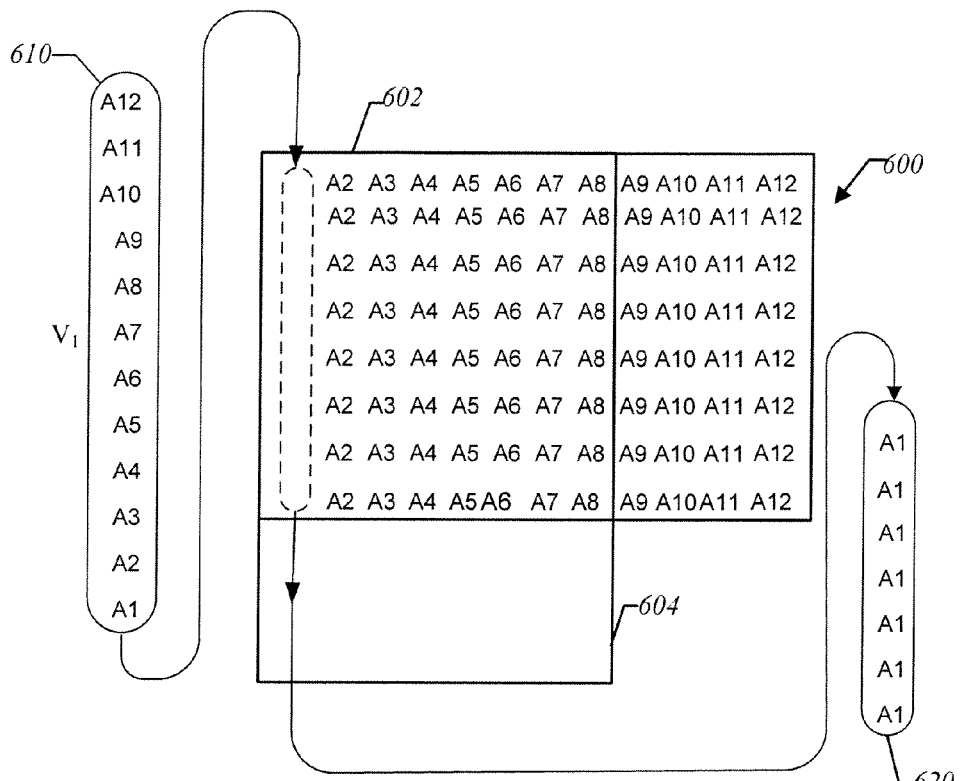

FIG. 6 illustrates the memory space of FIG. 5 subject to transposition functions during a first phase, according to one embodiment of the invention. In this phase, the transposer operates to extract common attribute types, such as common attribute type "A1" 620 as it vertically writes new vertices into memory space 600. In this example, the transposer vertically reads Group 620 of A1 attributes as it vertically writes vertex 610 into a column that extends through overlapped region 602 and into spill-over region 604.

Figure 7:
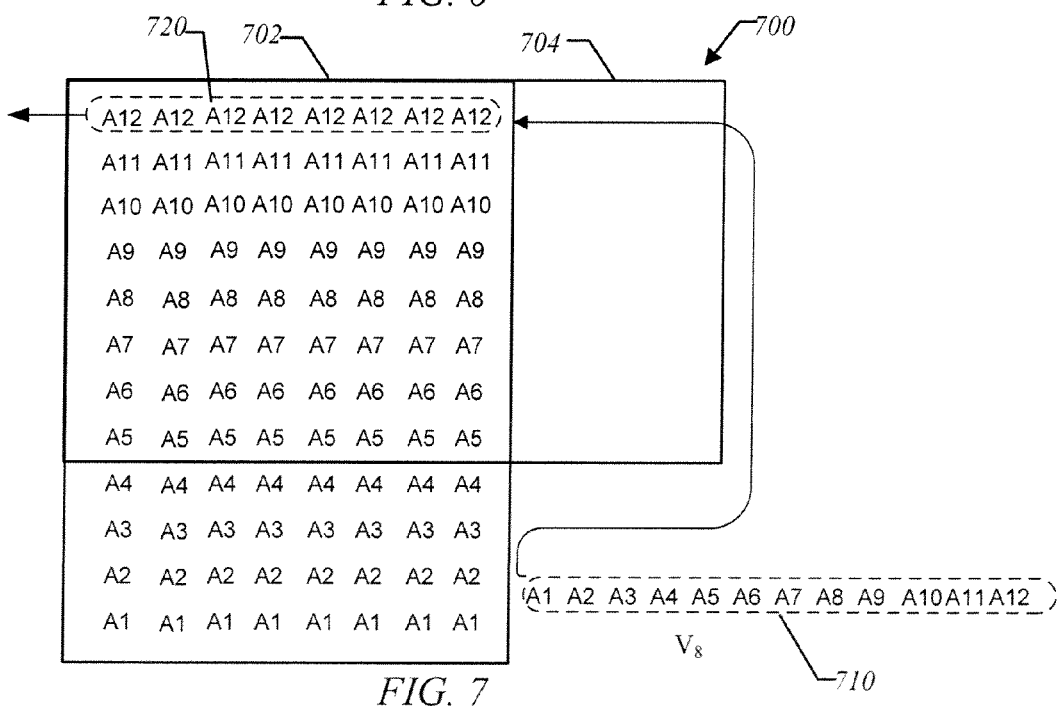

FIG. 7 illustrates the memory space of FIG. 6 subject to transposition functions during a second phase, according to one embodiment of the invention. In this phase, the transposer operates to extract common attribute types, such as common attribute type "A12," in an orientation different from the orientation used to read group 620 from memory space 600 in FIG. 6. In this example, the transposer horizontally reads group 720 of "A12" attributes from memory space 700 as it vertically writes new vertices, such as vertex ("V8") 710, into memory space 700. As shown, vertex 710 is written into a row that extends through overlapped region 702 and into spill-over region 704.

Figure 8:
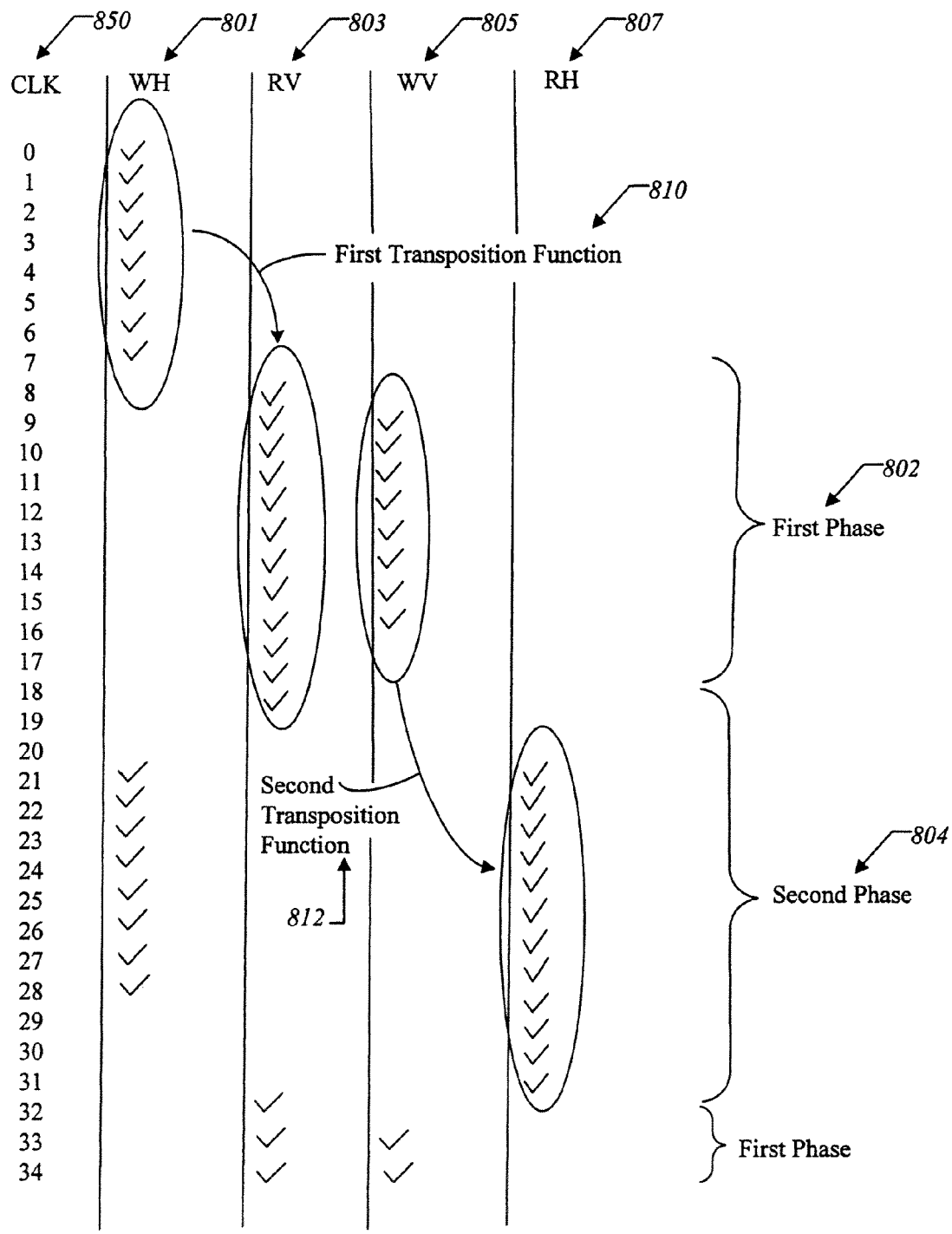
FIG. 8 illustrates the relative timing during which a transposer performs its transposition functions in accordance with an embodiment of the invention.

FIG. 8 illustrates the relative timing during which a transposer performs its transposition functions in accordance with an embodiment of the invention. During initialization, a transposer horizontally writes vertices and their vertex attributes into a data arrangement as shown in the Write Horizontally column ("WH") 801. In phase one ("first phase") 802, the transposer performs at least part of a first transposition function 810 by vertically reading the attributes as shown in the Read Vertically column ("RV") 803. Concurrent (or nearly concurrent) with vertical reads 803, the transposer writes a next batch of vertices and their attributes as shown in the Write Vertically column ("WV") 805, which is in a different orientation than was used to previously write into the data arrangement. A clocking column ("CLK") 850 depicts the relative timing of the phases as well as the transposition functions with respect to clock cycles 0 to 34. During phase two ("second phase") 804, the transposer performs a second transposition function 812 by horizontally reading the attributes as shown in the Read Horizontally column ("HV") 807. Similar to phase one 802, phase two 804 includes a concurrent (or nearly concurrent) write cycle, thereby causing an overlapped memory region to be optimally used to require less memory capacity. The phases repeatedly alternate, as does the performance of transposition functions, according to one embodiment of the invention.

FIG. 9 illustrates an example of a transposer using a memory space that implements double buffering in accordance with an embodiment of the invention. In this example, a transposer horizontally writes vertices and their vertex attributes into a buffer ("1") 900 during phase one as it vertically reads common types of attributes from another buffer ("2") 902. In phase two, the transposer vertically reads common types of attributes from buffer ("1") 900 as it horizontally writes vertices into buffer ("2") 902. Generally, double buffering can be used when conservation of memory capacity is not desired.

Figure 10:
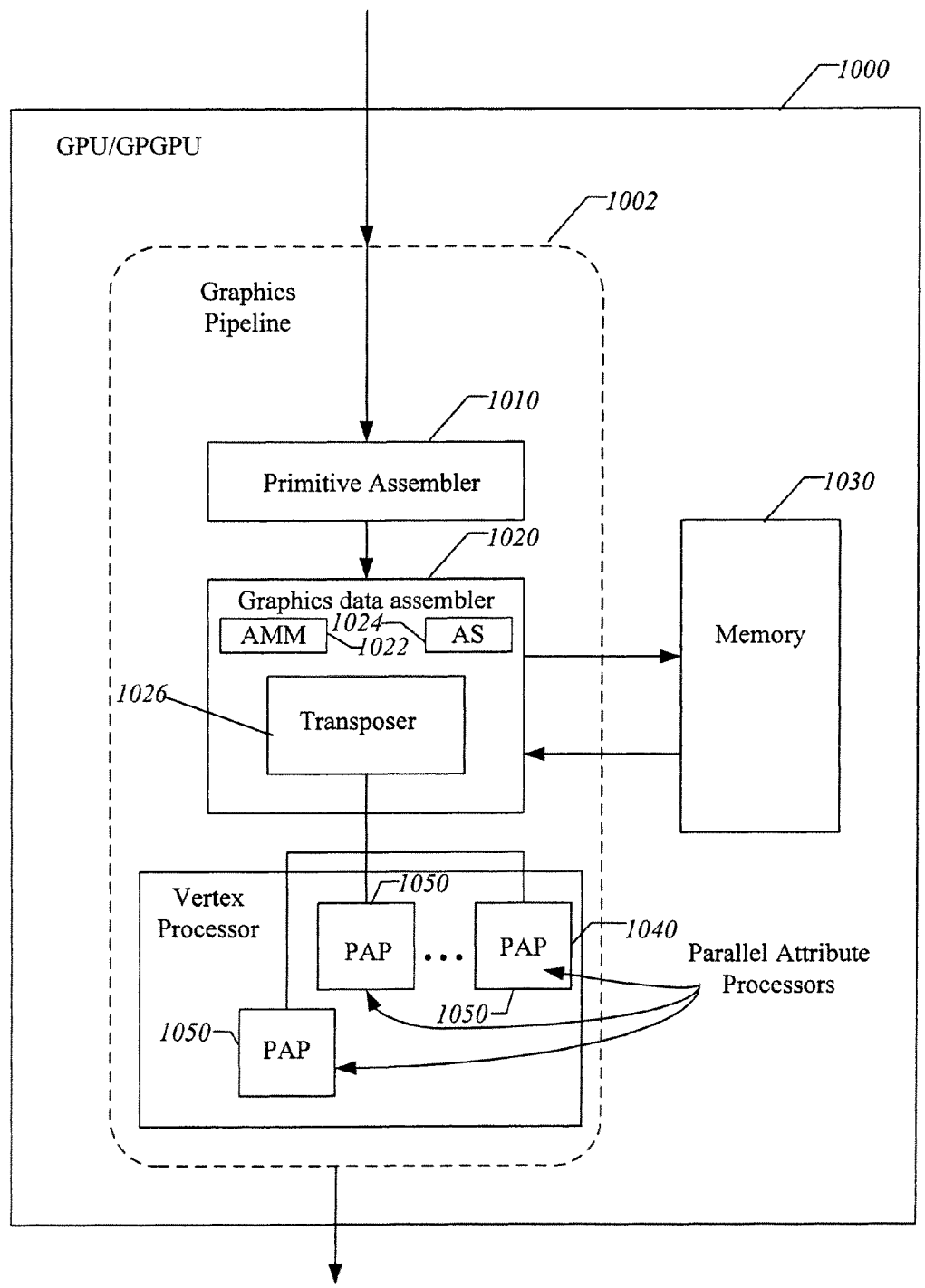
FIG. 10 illustrates an example of a graphics processing unit ("GPU") implementing a transposer in accordance with an embodiment of the invention.

FIG. 10 illustrates an example of a graphics processing unit ("GPU") implementing a transposer in accordance with an embodiment of the invention. In this example, GPU 1000, which can be a general purpose GPU ("GPGPU"), includes a graphics pipeline 1002 for rendering images through various graphics operations, such as geometric transformations, clipping, lighting, scaling and the like. Graphics pipeline 1002 includes a primitive assembler 1010 for assembling primitives. Also, graphics pipeline 1002 can include a graphics data assembler 1020 for fetching—at least in part—vertex attributes from a memory 1030, which can be a frame buffer. Further, graphics pipeline 1002 can include a vertex processor (or shader) 1040 to perform parallel processing by a number of parallel attribute processors ("PAPs") 1050. Each PAP 1050 is associated with one of the parallel data streams produced by graphics data assembler 1020.

Graphics data assembler 1020 includes a transposer 1026, an attribute arrangement manager ("AMM") 1022 and an attribute selector ("AS") 1024. In one embodiment, attribute arrangement manager 1022 can include—in whole or in part—executable instructions to fetch vertex information including vertex attributes from memory 1030 and to store the vertex attributes into a memory describable in terms of rows and columns, the memory residing in transposer 1026. Attribute selector 1024 can include—in whole or in part—executable instructions to generate parallel data streams each of which relate to a common vertex attribute from the vertices. Further, graphics data assembler 1020 can include executable instructions to emulate transposition of the attributes to derive common types of attributes as individual parallel data streams for each PAP 1050. In one embodiment, vertex processor (or shader) 1040 is a multithreaded vertex processor implementing single instruction, multiple data ("SIMD") stream processing. Note while the above-mentioned SIMD-based processor has been described with respect to a vertex processor, graphics data assembler 1020 can generate parallel data streams for any other SIMD-based processor, such as a SIMD-based pixel shader or the like.

An embodiment of the present invention relates to a computer storage product with a computer-readable medium having computer code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention can be implemented using Java, C++, or other object-oriented programming language and development tools. Another embodiment of the invention can be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the invention to any embodiment; rather features and aspects of one embodiment may readily be interchanged with other embodiments.

Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the invention; rather any specific embodiment can provide one or more of the advantages discussed above. It is intended that the following claims and their equivalents define the scope of the invention.

The invention claimed is:

1. A graphics processing unit (GPU) comprising:
a graphics pipeline, including:
a graphics data assembler having an input configured to receive a plurality of graphics elements in a graphics element data stream, said graphics elements used by said GPU to form computer-generated images;
a transposer within the graphics pipeline configured to convert the graphics elements data stream executable by multiple threads of execution, the transposer configure to produce parallel attribute streams, each of said parallel attribute streams including a type of attribute common to said plurality of graphics elements;
a Single Instruction, Multiple Data (SIMD) vertex processor having multiple parallel attribute processors, the SIMD vertex processor configured to perform multiple threads of execution, said parallel attribute processors receiving said parallel attribute streams from said transposer for parallel processing;
wherein said transposer is configured to store vertex information for "x" vertices, each of said "x" vertices including "y" vertex attributes as scalars, whereby said transposer is configured to store said "x" vertices in a first orientation and is configured further to extract one of said "y" vertex attributes for each of said "x" vertices.

2. The GPU of claim 1 wherein said transposer further comprises a memory for storing portions of said graphics elements in a data arrangement having rows and columns, said transposer being configured to perform transposition functions that modify the ordering of data exiting said transposer from the order of said data entering said transposer, thereby emulating the transposition of said data arrangement.

3. The GPU of claim 1 wherein said transposer is configured to perform transposition functions that include a first transposition function and a second transposition function.

4. The GPU of claim 3 wherein said transposer further comprises a memory, said memory including:
   an overlapped memory region subject to substantially concurrent performance of said first transposition function and said second transposition function, and
   spill-over regions subject to one of said first transposition function or said second transposition function.

5. The GPU of claim 4 wherein the memory capacity of the combination of said overlapped memory region and said spill-over regions is less than two separate buffers implementing double buffering.

6. The GPU of claim 1 further comprising:
   an attribute arrangement manager configured to influence said plurality of graphics elements to enter said transposer in a first orientation; and
   an attribute selector configured to
      identify subsets of attributes that each include the same type of attribute, and
      select said subset of attributes for extraction from said transposer in a second orientation,
   wherein said attribute arrangement manager and said attribute selector switch are configured to switch orientations during different phases.

7. The GPU of claim 6 wherein said attribute arrangement manager arranges data for said plurality of graphics elements into a matrix and said attribute selector accesses said data as a transposed matrix.

8. The GPU of claim 6 wherein said first orientation is in the same direction as one or more rows and said second orientation is in the same direction as one or more columns.

9. The GPU of claim 1 wherein said plurality of graphics elements include a plurality of vertices each of which has any number of attributes, which include one or more of:
   a coordinate describing position,
   a color component,
   texture information, and
   one or more normal vectors.

10. The GPU of claim 1 wherein said transposer comprises:
   a memory having a data arrangement describable as a matrix in terms of rows and columns; and
   means for controlling access to said memory to emulate transposition of said matrix.

11. The GPU of claim 1 wherein said transposer includes a memory that is configured to provide substantially simultaneous access to store vertex attributes associated with said graphics elements data stream and to provide subsets of said vertex attributes.

12. The GPU of claim 1 wherein said transposer comprises:
   a first buffer configured to store vertex information associated with said graphics elements data stream, the vertex information including vertex attributes; and
   a second buffer configured to provide subsets of said vertex attributes, said first buffer and said second buffer implementing a double buffer.

13. The GPU of claim 1 wherein said multithreaded processor vertex processor is configured to operate with a single stream of instruction and multiple streams of data.

* * * * *